3,070,499
PARENTERAL AQUEOUS SOLUTIONS OF FAT SOLUBLE VITAMINS
John D. Mullins, Lansdale, and Thomas J. Macek, Glenside, Pa., assignors to Merck & Co., Inc., Rahway, N.J., a corporation of New Jersey
No Drawing. Filed Sept. 19, 1960, Ser. No. 56,701
13 Claims. (Cl. 167—58)

This invention relates to pharmaceutical formulations. More particularly, it relates to stable aqueous vitamin compositions which are suitable for parenteral administration.

The usefulness of the water-insoluble vitamins such as vitamins A, D, E and $K_1$, hereinafter referred to as the oily vitamins or oil-soluble vitamins, in nutrition and for the prevention and treatment of certain diseases is well known. In the past, these vitamins have been administered orally in the form of tablets, pills, suspensions, emulsions and the like. However, in many instances it is often desirable to administer such vitamins parenterally either intramuscularly or intravenously. Unfortunately, because of the virtual water-insolubility of the oil-soluble vitamins, it has heretofore been necessary to employ emulsions of these vitamins or to utilize aqueous solutions of water-soluble derivatives of these vitamins. However, as is well known, the parenteral administration, particularly intravenous injection, of an emulsion of a fatty material is not without danger. Although aqueous solutions of water-soluble derivatives of these vitamins are somewhat more desirable, they have the disadvantage that the derivatives are not always equivalent in activity to that of the parent substance. Furthermore, some of the oil-soluble vitamin compounds do not form water-soluble derivatives which may be satisfactorily employed parenterally.

More recently, attempts have been made to prepare aqueous solutions which contained sufficiently high concentrations of the oil-soluble vitamins and were suitable for parenteral administration, particularly intravenous injection. Toward this end, investigators have searched for a suitable agent which would effectively solubilize these vitamins to the extent necessary for the preparation of satisfactory aqueous parenteral solutions and still be, in the concentrations employed for this purpose, non-toxic, non-hemolytic and non-irritating to the tissue when administered parenterally. Although many agents have been tested for this purpose, none has been found which provides a completely satisfactory solution of the problem. For example, polyoxyethylene ethers of lauryl alcohol have been proposed as solubilizing agents for vitamin $K_1$. Although some solubilization of vitamin $K_1$ is achieved with this material, the degree of solubilization is considerably less than is desired. In addition, this material, even at relatively low concentrations, causes considerable hemolysis when administered intravenously. Other agents, such as the polyethyleneglycol monoricinoleates and polyoxyethylene sorbitan monooleates, while somewhat more effective solubilizing agents for vitamin $K_1$, produce significant muscular irritation and hemolysis on parenteral administration.

According to the present invention, it has now been found that clear aqueous solutions of the oil-soluble vitamins can be prepared by dissolving the oil-soluble vitamin in a solubilizing agent comprising the condensation product of castor oil and ethylene oxide, and adding the resulting mixture to water. Such compositions have the properties and characteristics which render them highly adaptable for parenteral administration, particularly intravenous injection. Thus, it has been found that aqueous solutions containing relatively high concentrations of the oil-soluble vitamins can be prepared in the manner described above. For example, with vitamin $K_1$ concentrations of 10 mg. or more of vitamin $K_1$ per ml. of solution can readily be obtained. Furthermore, it has been found that the solubilizing agent when administered parenterally in concentrations sufficient to provide useful aqueous parenteral solutions of the oil-soluble vitamins is completely innocuous, non-hemolytic and non-irritating to tissue. These results were indeed very surprising and unexpected in view of the difficulties encountered heretofore with other polyoxyethylene compounds such as mentioned hereinabove.

As previously indicated herein, the vitamins employed in the aqueous compositions of this invention are those generally classified in the art as the fat-soluble or oily-vitamins, namely, vitamins A, D, E and $K_1$. However, although the natural form of these vitamins is preferred, any other fat-soluble substance possessing the vitamin activity of the above-mentioned vitamins may also be satisfactorily employed. Included among such substances are the fat-soluble esters of these vitamins; such as, for example, vitamin A palmitate, vitamin A acetate, vitamin E acetate and the like, the fat-soluble derivatives of vitamin $K_1$, such as, for example, 2-methyl-3-phytyl-1,4-naphthoquinone, 2,3-oxide and 2-methyl-3-difarnesyl-1,4-naphthoquinone.

The fat-soluble vitamins or fat-soluble substances possessing the desired vitamin activity can be employed singularly and in compatible combinations to provide aqueous solutions having the properties or combination of properties desired in various preparations for parenteral administration.

The amount of fat-soluble vitamin or fat-soluble vitamin active substance in the aqueous compositions of this invention will, of course, vary depending on the vitamin or vitamin active substances employed, mode of administration as well as the treatment desired. However, in general, those amounts which have heretofore been customarily employed and found satisfactory for parenteral administration may be used.

The solubilizing agent employed in the preparation of the aqueous solutions of this invention is as previously mentioned the condensation product of castor oil and ethylene oxide. In general, it has been found that satisfactory solubilizing agents for the fat-soluble vitamin substances are those condensation products which contain from about 20 to about 40 moles of ethylene oxide per mole of castor oil. However, castor oil-ethylene oxide condensation products combining from about 30 to about 35 moles of ethylene oxide per mole of castor oil are particularly effective and preferred. Such condensation products may be readily prepared in the manner described in German Patent No. 694,178, published on July 27, 1940. A number of these products are available commercially from the General Aniline and Film Corporation under the name "Emulphor," e.g., Emulphor EL–620 and Emulphor EL–719 and from the Process Chemicals Company under the name "Prosol" such as, for example, Prosol E–4329.

In the preparation of the aqueous solutions of this invention, it is essential that the fat-soluble vitamin substance be first dissolved in the solubilizing agent. After solution is complete, water is then slowly added maintaining good agitation until the final concentration of the vitamin substance in the aqueous solution is obtained. The amount of solubilizing agent employed will, of course, vary depending on such factors as the particular fat-soluble vitamin substance or substances employed and the concentration of vitamin or vitamin active substance desired in the final solution. However, in general, it has been found that satisfactory results are obtained when from about 5 mg. to about 25 mg. and preferably from about 7 mg. to about 15 mg. of the solubilizing agent per mg. of vitamin is employed. Aqueous fat-soluble vitamin compositions prepared in the above manner and containing from about 5% to about 25% of the solubilizing agent (weight/volume) are highly satisfactory for parenteral administration. However, solutions containing from about 7% to about 15% of the solubilizing agent are preferred. It is to be noted that although the above ranges represent practical limits, the ratio of solubilizing agent to vitamin as well as the final concentration of solubilizing agent in solution may be increased somewhat but some difficulty will be encountered in administering such solutions parenterally because of increased viscosity.

The aqueous solutions of this invention are as mentioned above highly suitable for parenteral administration, particularly intravenous injection. In such usage, the solutions may, in addition to the above-mentioned ingredients, contain other water-soluble ingredients, including one or more water-soluble vitamins, saline, glucose, dextrose and the like.

In addition, to guard against bacterial decomposition of the vitamin in solutions to be stored for prolonged periods, it is desirable to incorporate a preservative in such solutions. Suitable preservatives include phenylethanol, benzyl alcohol, benzalkonium chloride, methyl parabens and methyl p-hydroxybenzoate. However, if the preparation of these solutions is carried out under sterile conditions and if the formulation is used immediately, the addition of a preservative is not necesary.

Where the addition of a preservative is desired, it is normally not necessary to employ a preservative in an amount in excess of 1.0% (weight/volume) of the composition. With the more effective preservatives concentrations as low as 0.1% (weight/volume) are satisfactory.

Since the aqueous solutions of this invention are intended for parenteral administration, it will be understood that appropriate steps should be taken to insure that the products are sterile and also that they are free of pyrogens. In this connection, sterilization can be readily effected by aseptic filtration. As for the control of pyrogen content, this is best carried out by employing pyrogen-free components and carrying out the preparation under esentially pyrogen-free conditions.

The following examples are included for the purpose of illustration and are not to be construed as any undue limitation of the scope of the appended claims.

*Example 1*

An aqueous solution suitable for parenteral administration and having the following composition is prepared as follows:

| | Mg. per ml. |
|---|---|
| Vitamin $K_1$ | 5 |
| Emulphor EL–620 | 70 |
| Distilled water, q.s. | |

The vitamin $K_1$ is dissolved in the Emulphor EL–620. Emulphor EL–620 is the condensation product of castor oil and ethylene oxide and contains about 34 moles of ethylene oxide per mole of castor oil. When the solution is complete, water is added slowly maintaining good agitation. The resulting solution is then sterilized by aseptic filtration under nitrogen pressure and subdivided into suitable vials for immediate use.

*Example 2*

An aqueous parenteral solution having the following composition is prepared according to the procedure of Example 1:

| | Mg. per ml. |
|---|---|
| Vitamin $K_1$ oxide | 10 |
| Prosol E–4329 | 50 |
| Distilled water, q.s. | |

Prosol E–4329 is the condensation product of castor oil and ethylene oxide and contains about 30 moles of ethylene oxide per mole of castor oil.

*Example 3*

An aqueous parenteral solution having the following composition is prepared according to the process of Example 1:

| | Mg. per ml. |
|---|---|
| Vitamin A | 7.5 |
| Emulphor EL–620 | 75 |
| Distilled water, q.s. | |

*Example 4*

An aqueous parenteral solution having the following composition is prepared according to the process of Example 1:

| | Mg. per ml. |
|---|---|
| Vitamin $D_2$ crystalline | 2.5 |
| Emulphor EL–719 | 50 |
| Distilled water, q.s. | |

Emulphor EL–719 is the condensation product of castor oil and ethylene oxide and contains about 40 moles of ethylene oxide per mole of castor oil.

*Example 5*

An aqueous parenteral solution having the following composition is prepared according to the process of Example 1:

| | Mg. per ml. |
|---|---|
| Vitamin $K_1$ | 10 |
| Emulphor EL–620 | 70 |
| Distilled water, q.s. | |

*Example 6*

An aqueous parenteral solution having the following composition is prepared according to the process of Example 1:

| | Mg. per ml. |
|---|---|
| Vitamin $K_2$ | 10 |
| Prosol E–4329 | 100 |
| Distilled water, q.s. | |

*Example 7*

An aqueous parenteral solution having the following composition is prepared according to the process of Example 1:

| | Mg. per ml. |
|---|---|
| Vitamin E | 50 |
| Prosol E–4329 | 250 |
| Distilled water, q.s. | |

*Example 8*

An aqueous parenteral solution having the following composition is prepared as follows:

| | Mg. per ml. |
|---|---|
| Vitamin $K_1$ | 5 |
| Emulphor EL–620 | 70 |
| Benzyl alcohol | 9 |
| Sodium chloride | 8 |
| Distilled water, q.s. | |

The vitamin $K_1$ is dissolved in the Emulphor EL–620. When the solution is complete, water is added slowly maintaining good agitation. When about 90% of the required volume is reached, the remaining ingredients are added. The resulting solution is then diluted to volume, sterilized by aseptic filtration and subdivided into suitable vials.

*Example 9*

An aqueous parenteral solution having the following composition is prepared according to the process of Example 8:

| | Mg. per ml. |
|---|---|
| Vitamin A palmitate | 8.2 |
| Emulphor EL–620 | 115 |
| Phenylethanol | 10 |
| Sodium chloride, to isotonicity. | |
| Distilled water, q.s. | |

Example 10

An aqueous parenteral solution having the following composition is prepared according to the process of Example 8:

| | Mg. per ml. |
|---|---|
| Vitamin E acetate | 50 |
| Prosol E-4329 | 250 |
| Methyl Parabens | 1.5 |
| Dextrose, to isotonicity. | |
| Distilled water, q.s. | |

Various changes and modifications of the invention can be made, and to the extent that such variations incorporate the spirit of the instant invention, they are intended to be included within the scope of the appended claims.

What is claimed is:

1. A parenteral aqueous solution comprising a fat-soluble vitamin active substance and as a solubilizing agent therefor a condensation product of castor oil and ethylene oxide, said condensation product containing from about 20 to about 40 moles of ethylene oxide per mole of castor oil and being present in said solution in an amount of from about 5 to about 25 milligrams per milligram of said fat-soluble vitamin active substance and said aqueous solution containing from about 5 to about 25% (weight/volume) of said solubilizing agent.

2. A parenteral aqueous solution comprising a fat-soluble vitamin active substance and as a solubilizing agent therefor a condensation product of castor oil and ethylene oxide, said condensation product containing from about 30 to about 35 moles of ethylene oxide per mole of castor oil and being present in said solution in an amount of from about 5 to about 25 milligrams per milligram of said fat-soluble vitamin active substance and said aqueous solution containing from about 5 to about 25% (weight/volume) of said solubilizing agent.

3. A parenteral aqueous solution comprising a fat-soluble vitamin active substance and as a solubilizing agent therefor a condensation product of castor oil and ethylene oxide, said condensation product containing from about 30 to about 35 moles of ethylene oxide per mole of castor oil and being present in said solution in an amount of from about 7 to about 15 milligrams per milligram of said fat-soluble vitamin active substance and said aqueous solution containing from about 7 to about 15% (weight/volume) of said solubilizing agent.

4. A parenteral aqueous solution comprising a fat-soluble substance having vitamin K activity and as a solubilizing agent therefor a condensation product of castor oil and ethylene oxide, said condensation product containing from about 30 to about 35 moles of ethylene oxide per mole of castor oil and being present in said solution in an amount of from about 7 to about 15 milligrams per milligram of said fat-soluble substance and said aqueous solution containing from about 7 to about 15% (weight/volume) of said solubilizing agent.

5. The composition of claim 4 wherein the fat-soluble substance is vitamin $K_1$.

6. The composition of claim 4 wherein the fat-soluble substance is vitamin $K_1$ oxide.

7. A parenteral aqueous solution comprising a fat-soluble substance having vitamin A activity and as a solubilizing agent therefor a condensation product of castor oil and ethylene oxide, said condensation product containing from about 30 to about 35 moles of ethylene oxide per mole of castor oil and being present in said solution in an amount of from about 7 to about 15 milligrams per milligram of said fat-soluble substance and said aqueous solution containing from about 7 to about 15% (weight/volume) of said solubilizing agent.

8. A parenteral aqueous solution comprising a fat-soluble substance having vitamin D activity and as a solubilizing agent therefor a condensation product of castor oil and ethylene oxide, said condensation product containing from about 30 to about 35 moles of ethylene oxide per mole of castor oil and being present in said solution in an amount of from about 7 to about 15 milligrams per milligram of said fat-soluble substance and said aqueous solution containing from about 7 to about 15% (weight/volume) of said solubilizing agent.

9. A parenteral aqueous solution comprising a fat-soluble substance having vitamin E activity and as a solubilizing agent therefor a condensation product of castor oil and ethylene oxide, said condensation product containing from about 30 to about 35 moles of ethylene oxide per mole of castor oil and being present in said solution in an amount of from about 7 to about 15 milligrams per milligram of said fat-soluble substance and said aqueous solution containing from about 7 to about 15% (weight/volume) of said solubilizing agent.

10. An aqueous parenteral solution having the following composition:

| | Mg. per ml. |
|---|---|
| Vitamin $K_1$ | 10 |
| Condensation product of castor oil and ethylene oxide containing about 34 moles of ethylene oxide per mole of castor oil | 70 |
| Benzyl alcohol | 9 |
| Sodium chloride | 8 |

11. A parenteral aqueous solution comprising a fat-soluble vitamin active substance and as a solubilizing agent therefor a condensation product of castor oil and ethylene oxide, said condensation product containing from about 20 to about 40 moles of ethylene oxide per mole of castor oil and being present in said solution in an amount sufficient to solubilize said fat-soluble vitamin active substance.

12. A parenteral aqueous solution comprising a fat-soluble vitamin active substance and as a solubilizing agent therefor a condensation product of castor oil and ethylene oxide, said condensation product containing from about 20 to about 40 moles of ethylene oxide per mole of castor oil and being present in said solution in an amount of at least 5 mg. per mg. of said fat-soluble vitamin substance and said aqueous solution containing from about 5 to about 25% (weight/volume) of said solubilizing agent.

13. The composition of claim 12 wherein the fat-soluble substance is vitamin $K_1$.

References Cited in the file of this patent

UNITED STATES PATENTS

| 2,518,230 | Freedman et al. | Aug. 8, 1950 |
| 2,879,205 | McQuarrie | Mar. 24, 1959 |

OTHER REFERENCES

Encyclopedia of Surface Active Agents, Sisley et al., Chemical Publishing Co., Inc., New York, February 1959, page 293.

Mima et al.: J. Pharm. Soc. of Japan, vol. 77, November 1957, pages 1201–1203.